United States Patent [19]
Beck

[11] 4,004,499
[45] Jan. 25, 1977

[54] BOLT-ON PISTON ASSEMBLY
[75] Inventor: Michael J. Beck, Wausau, Wis.
[73] Assignee: J. I. Case Company, Racine, Wis.
[22] Filed: Sept. 17, 1975
[21] Appl. No.: 614,149
[52] U.S. Cl. .................................. 92/257; 92/255; 92/258; 403/261
[51] Int. Cl.² .......................................... F16J 1/12
[58] Field of Search ............ 92/255, 257, 244, 251, 92/258, 201, 205, 206; 403/262, 261

[56] References Cited
UNITED STATES PATENTS

| | | | |
|---|---|---|---|
| 748,233 | 12/1903 | Swan | 92/257 X |
| 970,903 | 9/1910 | Fennell | 92/255 X |
| 1,521,388 | 12/1924 | Pielstick | 92/255 X |
| 1,538,132 | 5/1925 | Minnier | 92/255 |
| 2,729,523 | 1/1956 | Von Lassberg et al. | 92/255 X |
| 3,108,514 | 10/1963 | Gordon | 92/258 X |
| 3,115,071 | 12/1963 | Strader | 92/257 |
| 3,168,301 | 2/1965 | Allinquant | 92/250 x |
| 3,397,893 | 8/1968 | Kampert | 92/244 X |
| 3,426,656 | 2/1969 | Bimba | 92/255 |
| 3,426,657 | 2/1969 | Bimba | 92/255 |
| R15,806 | 4/1924 | Harasta | 92/205 |

FOREIGN PATENTS OR APPLICATIONS

| | | | |
|---|---|---|---|
| 718,583 | 11/1954 | United Kingdom | 92/251 |

*Primary Examiner*—Irwin C. Cohen
*Attorney, Agent, or Firm*—Arthur J. Hansmann

[57] ABSTRACT

A bolt-on piston assembly wherein two piston pieces are clamped onto the rod which has an integral radial projection thereon for axially restricting the piston pieces disposed on axially opposite sides of the projection. A plurality of bolts extend into the pieces for releasably clamping the pieces relative to the radial projecting portion of the rod.

3 Claims, 3 Drawing Figures

BOLT-ON PISTON ASSEMBLY

This invention relates to a bolt-on piston assembly, and, more particularly, it relates to an assembly of the type where two piston pieces are bolted together on a piston rod to render the piston fluid-tight and capable of high impact loads and yet one which can be disassembled from the rod, if desired.

BACKGROUND OF THE INVENTION

The prior art is already aware of piston and rod assemblies wherein the piston itself is made of two or more pieces which are releasably related to the rod and may be releasably fastened to each other such as by bolts or the like. One example of the prior art is found in U.S. Pat. No. 3,055,719 wherein bolts are employed for fastening two piston pieces together on opposite sides of a split ring on the rod. Another prior art example is found in U.S. Pat. No. 3,457,842 which also utilizes a split ring and a piston which is axially secured to the rod by relating to the split ring. However, in the prior art, the assembled piston is not fully axially secured and limited relative to the rod, and the resulting assembly is not sturdy and easily rendered fluid-tight, as compared to the present invention.

Accordingly, the present invention provides an assembly of a piston and a rod constituting an improvement over the assemblies heretofore known. More specifically, the present invention provides a piston and rod assembly of a bolt-on type wherein the piston is completely axially fixed relative to the rod and there is therefore no axial movement of the piston relative to the rod. Still further, the present invention provides the assembly mentioned and it does so with an assembly which is fluid-tight in the joints between the piston and the rod surfaces, and the aforementioned is accomplished without unduly complex constructions and without a large number of parts and fluid seals.

Still further, the present invention provides a piston and rod assembly wherein the assembly can be readily and easily accomplished and the unit can be disassembled, when and if such is desired. Also, the aforementioned objectives are accomplished and the resulting assembly provides a construction which can withstand high impact loads, compared to the impact loads which can be withstood by the assemblies of the prior art, and this objective is accomplished because of the arrangement of the assembly and particularly because there is no axial movement of the piston relative to the rod in the final assembled position. Therefore, impact loads will not tend to damage the assembly by having the piston move relative to the rod and hit against the rod or the like, as is possible with the prior art assemblies which inherently have axial play or movement of the piston relative to the rod.

Other objects and advantages will become apparent upon reading the following description in light of the accompanying drawings.

DETAILED DESCRIPTION OF THE PREFERRED EMBODIMENTS

Figure 2:
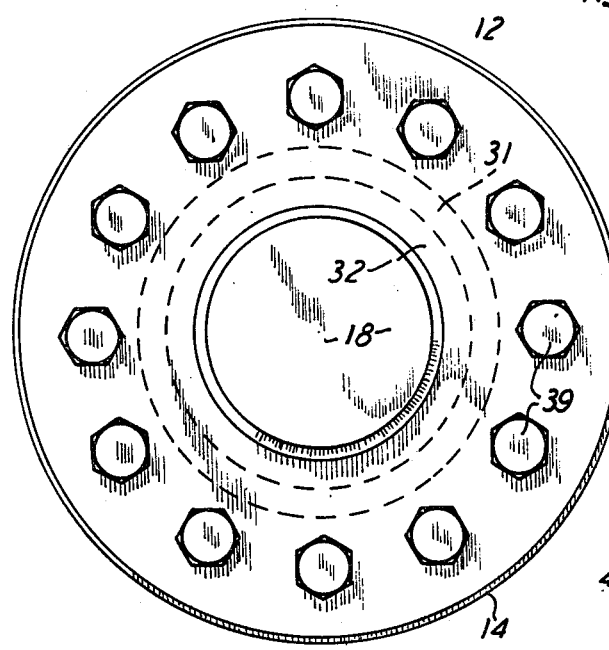
FIG. 2 is an end elevational view of the piston and rod assembly of FIG. 1.
Figure 1:
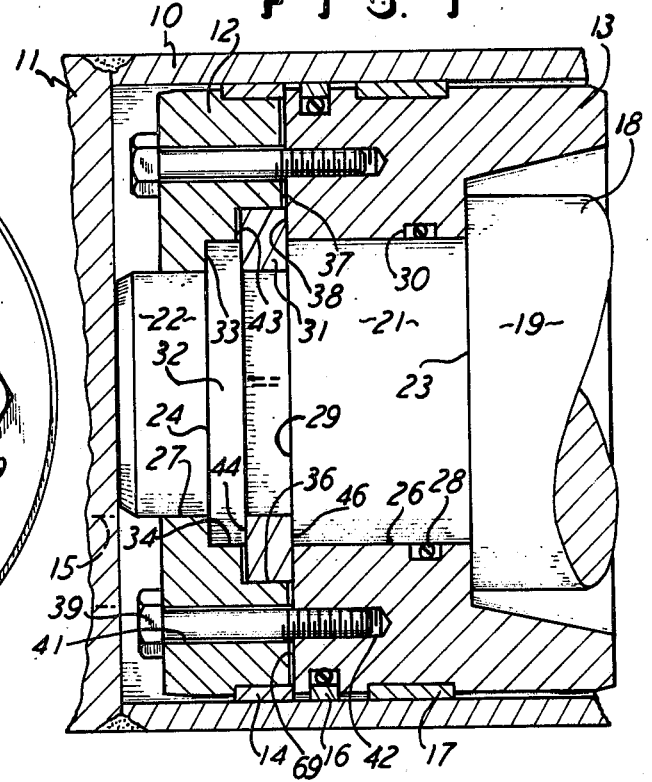
FIG. 1 is a longitudinal sectional view of one embodiment of the assembly of this invention and showing a fragment of the cylinder assembly.

FIG. 1 shows a fragment of a conventional cylinder 10 having a usual end cap 11 which is provided with a fluid port 15. The assembled piston and rod are shown enclosed within the cylinder 10, and the piston includes the two pieces 12 and 13 which are ringshaped and which are fluid-tight with the inner circular wall of the cylinder 10 by means of conventional seals 14 and 16 and 17, and seal 14 is shown clamped between the pieces 12 and 13. Thus, the piston pieces 12 and 13 are piloted on the rod 18, and the assembly moves axially of the cylinder 10, in the usual function of the cylinder assembly.

FIG. 1 shows only the extending end of the rod 18, including the enlarged portion 19 and the reduced portions 21 and 22. Thus, the entire assembly would be one which is well known to a person skilled in the art and which would have the portion 19 extending to the right, as viewed in FIG. 1, for a length considerably longer than the length shown in FIG. 1. The rod 18 has a shoulder 23 between the portions 19 and 21, and it also has a shoulder 24 between the portions 21 and 22. The portions 21 and 22 would be the usual turned portions to provide a smooth circumference for snug fitting with the internal diameters 26 and 27, respectively, of the pieces 13 and 12. Also, the piece 13 has a fluid seal, in the form of an O-ring 28 disposed in a groove 30 extending around the interior of the piston piece 13 to thus provide a fluid seal between the piece 13 and the rod portion 21.

The rod 18 has a circular ring groove 29 extending endlessly therearound, and a split ring engagement means 31 is disposed in the groove 29 and extends radially beyond the circumference of the rod portion 21. Thus, the groove 29, and the ring 31, are disposed contiguous to an enlarged rod portion 32 which is shown in FIG. 1 to actually be the end portion of the rod section 21 and which is herein described as being an integral projecting portion of the rod 18 since it projects beyond the rod portion 22 and the base of the ring groove 29. The piston piece 12 has a surface 33 which is in abutment with the projecting portion shoulder or surface 24, and the piece 12 also has a cylindrical length designated 34 which extends over the projecting portion 32 but the axial length of the cylindrical portion 34 is less than the axial length of the projecting portion 32, for a reason hereinafter mentioned. Also, the piece 12 is shown to have another circular length designated 36 and extending axially over the split ring 31 which may be a ring of any conventional split construction well known to one skilled in the art. Again, the axial length of the piston piece in its circular wall 36 is less than the axial length of the ring 31, for a reason hereinafter mentioned. The pieces 12 and 13 have respective end surfaces 37 and 38 which are shown adjacent each other in the assembled position in FIG. 1. Finally, the pieces 12 and 13 are fastened together by means of twelve bolts 39 which extend through bolt holes 41 in the piece 12 and into threaded holes 42 in the piece 13 for securely and firmly holding the two pieces 12 and 13 as a single assembled piece.

The reason for the axial lengths of the circular walls 34 and 36 of the piece 12 being less than the respective axial lengths of the rod portion 32 and the split ring 31 is to assure that the pieces 12 and 13 will be absolutely clamped relative to the rod portion 32 without any axial end play or movement possible between the assembled piston and the rod 18. Therefore, the piece 12 is in full contact and abutment with its surface 33 against the rod surface 24 and with its surface 43 against the split ring surface 44, and the piston piece surface 38 is in tight abutment with the ring surface 46, all by virtue of the axial lengths described above. With that arrangement, the piston pieces 12 and 13 relate to the rod 18 to have snug and tight contact along the rod circular surface 24 and the rod circular surface 34 and the ring surface 46. That is, the piston pieces 12 and 13 can be secured together by the bolts 39 sufficiently tightly to provide the full contact at the surfaces mentioned and thus avoid any axial movement or play of the piston relative to the rod 18, and there is actually fluid sealing effected at the contact surfaces mentioned and thus fluid cannot move along the rod surface 18 and past the piston piece 12. Therefore, the assembly is not dependent upon close tolerances relative to a split ring which may be commonly used for purposes of locating piston pieces on a rod, such as in U.S. Pat. No. 3,055,719 wherein there can be axial movement of the two piston pieces to the extent that the split ring is movable in the ring groove on the rod. With this arrangement there are the two endlessly circular piston pieces 12 and 13 encircling the rod 18 and disposed on axially opposite sides of the rod projecting portion 32 and with each of the pieces having a surface, such as the surface 33 on the piece 12 and the surface 38 on the piece 13 which are clamped relative to the projecting portion 32 by means of the bolts 39. Also, the assembly is such that there is no requirement for any separate fluid seal member between the piston piece 12 and the rod 18, since the piece 12 is sufficiently in abutment with the rod shoulder or surface 24 to be effectively fluid-tight therewith.

Figure 3:
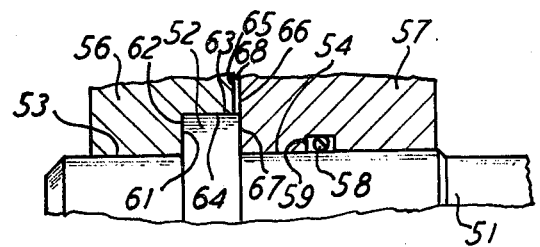
FIG. 3 is a view of a fragment of another embodiment of the assembly disclosed in FIG. 1.

FIG. 3 shows an arrangement of a piston rod 51 which has an integral projecting circular portion 52 extending endlessly around the rod 51 and beyond the adjacent rod circumferences 53 and 54 which may be turned portions for receiving respective piston pieces 56 and 57. The piece 57 may have an O-ring 58 disposed in a ring groove 59 for fluid sealing between the piece 57 and the rod 51. The piston piece 56 has its surface 61 in tight contact with the integral projecting portion surface 62, for fluid sealing thereat as mentioned in connection with FIG. 1, and the ring projecting portion 52 has its cylindrical surface 63 extending for a length greater than the length of the circular portion 64 of the piece 56. Therefore, when the pieces 56 and 57 are completely and tightly bolted toward each other, the piece 57 has its surface 66 in tight contact with the circular surface 67 of the projecting portion 52 defining an engagement means, and thus the piece surface 66 is faced from the opposite piece surface 65. In both embodiments, as shown, the integral projection portions 32 and 52 are of external diameters less than the internal diameter of the cylinder 10, and the piston pieces 12, 13 and 56, 57 have outer diameters greater than the external diameters of portions 32 and 52, and of ring 31, to extend radially beyond portions 32 and 52 and ring 31, to adjacent the wall of cylinder 10. The FIG. 3 embodiment has the rod integral portion 52 with the piston pieces 56 and 57 on opposite sides thereof and in abutment at the projecting portion surfaces designated 62 and 67 to be completely snug with the projecting portion 52 and to avoid any axial movement of the piston pieces 56 and 57 relative to the rod 51 and to actually provide for fluid sealing at the surfaces 62 and 67. Therefore, FIG. 3 actually shows a slight space 68 between the piston pieces 56 and 57, and that would also be true in the piston pieces 12 and 13 so that the pieces 12 and 13 are fully and snugly clamped relative to the projecting portion 32, as mentioned in connection with FIG. 1 but they present a space at 69 between their facing surfaces 37 and 38, and FIG. 1 shows the seal 14 spans the space 69 and extends between the pieces 12 and 13.

What is claimed is:

1. A bolt-on piston assembly comprising a piston rod having an integral portion projecting radially on said rod, two endlessly circular piston pieces encircling said rod and being disposed on axially opposite sides of said portion and with said pieces each having a surface respectively faced toward said portion to be clamped relative thereto and be axially fixed relative to said rod, said piston pieces each having an outer diameter greater than the outer diameter of said portion to extend radially beyond said portion, said pieces being entirely separated from one another by a space, one of said piston pieces having a section thereof extending axially of said rod and axially over said portion, the surface of said one piston piece being in axial abutment with said portion, the axial length of said section being less than the axial length of said portion for effecting clamping of said pieces onto the projecting said portion and have said pieces without movement axially of and relative to said rod, engagement means interposed between said surface of said other piston piece and said portion, bolts extending into said piston pieces radially beyond said portion for releasably securing said piston pieces on said portion to be axially fixed relative thereto for attaching said piston pieces onto said rod, and a seal member disposed in said space between said piston pieces at the outer diameters of said piston pieces.

2. The bolt-on piston assembly as claimed in claim 1, wherein said rod has a groove extending therearound contiguous to said portion, said engagement means comprising a ring in said groove and extending radially beyond the radial extent of said portion, and said surface of the other of said piston pieces being in axial abutment with said ring, for the clamping of said piston pieces relative to said portion.

3. The bolt-on piston assembly as claimed in claim 1, wherein said engagement means is defined by a direct abutment relationship between said surface of said other piston piece and said portion.

* * * * *